United States Patent [19]
Kitamura et al.

[11] 3,917,510
[45] Nov. 4, 1975

[54] LYSIS OF YEAST CELL WALLS
[75] Inventors: Kumpei Kitamura; Yasushi Yamamoto; Eiichi Kokubo; Yoshiro Kuroiwa, all of Takasaki, Japan
[73] Assignee: Kirin Beer Kabushiki Kaisha, Kyobashi, Japan
[22] Filed: Apr. 8, 1974
[21] Appl. No.: 458,954

[30] Foreign Application Priority Data
Apr. 11, 1973 Japan.............................. 48-40375
Apr. 11, 1973 Japan.............................. 48-87864

[52] U.S. Cl. ......................... 195/2; 195/4; 195/65; 195/66 R
[51] Int. Cl.² ........................................ C12B 1/00
[58] Field of Search.......... 195/2, 4, 12, 29, 65, 66, 195/76, 114

[56] References Cited
UNITED STATES PATENTS
2,095,300  10/1937  Wallerstein............................ 195/29
3,716,452  2/1973   Kitamura et al........................ 195/2
3,795,586  3/1974   Ziffer..................................... 195/66 R X OTHER PUBLICATIONS
Perlman et al. "Methods of Enzymobgy" Vol. XIX "Proteolytic Enzymes" Academic Press 1970 pp. 234–236 QP 601 C 72.

Primary Examiner—A. Louis Monacell
Assistant Examiner—R. B. Penland
Attorney, Agent, or Firm—Goldsmith & Deschamps Ladas, Parry, Von Gehr

[57] ABSTRACT

Lysis of yeast cell walls in an aqueous medium by an enzyme which is capable of lysing the yeast cell walls is accelerated by effecting the lysis in the presence of a water-soluble sulfite or by effecting the lysis on the yeast which has been pretreated with a water-soluble sulfite. The water-soluble sulfite can contain another water-soluble inorganic salt or cupric ions.

18 Claims, No Drawings

LYSIS OF YEAST CELL WALLS

BACKGROUND OF THE INVENTION

This invention relates to a method of lysis of yeast cell walls with the yeast cell wall lytic enzymes.

Many kinds of yeast are produced for food, feed and other industrial purposes.

As the availability of yeast cell inclusion is considered to be increased by removal of yeast cell walls, various methods for removal of yeast cell walls have been proposed. Among them, mild enzymic treatment is believed to have more advantages than the drastic physical and chemical treatments, e.g., heat treatment, treatment with a concentrated acid or with a concentrated alkali, because of protection of yeast cell inclusion from remarkable destruction or denaturation.

As a method of lysis of yeast cell walls with an enzymic action, that using snail digestive juice prepared from gut of Helix pomatia is well known. In addition to snail enzyme, many methods using various enzymes originated from microorganisms have been reported. But the extent of lysis of viable yeast cells by these methods varies very often with the conditions of the culture of the yeast. Especially, the cell walls of yeasts cultured aerobically to stationary growth phase are hardly lysed by the enzymes mentioned above. For example, snail enzyme can not lyse the cell walls of commercial baker's yeast which is prepared under the cultural condition with violent aeration. And for the effective lysis of such yeast cell walls, it is well known that addition of thio-compounds like mercaptoethanol to the reaction mixture with the enzyme or pre-treatment of yeast cells by these thio-compounds are required. These methods, however, may not have industrial advantages in view of cost and odor.

As yeasts including those of strains utilizing hydrocarbons have been produced on a large scale in food and feed industries and yeasts production industries are supposed to develop rapidly to overcome the forthcoming food crisis, the method for lysing these yeast cells by the yeast cell wall lytic enzymes, not using thiocompound, is believed to have many industrial advantages.

SUMMARY OF THE INVENTION

The purpose of this invention is to lyse effectively the yeast cell walls including those which are hardly lysed by yeast cell wall lytic enzymes and the present inventors accomplished the purpose using sulfite with or without inorganic salts or cupric ion as an agent promoting the lysis of yeast cell walls. Therefore, the methods proposed by this invention are principally characteristic in performance of lysis of yeast cell walls under the influence of sulfites, and practically characteristic in performance of lysis of yeast cell walls by coexistence of the lytic enzymes with sulfites or sulfites and inorganic salts, or by the lytic enzymes with or without inorganic salts after the pretreatment of the yeast by sulfites or sulfites and cupric ions.

According to the broadest aspect of the present invention, there is provided the improvement in a method for lysis of yeast cell walls wherein the yeast is subjected to treatment in an aqueous medium with an enzyme which is capable of lysing the yeast cell walls thereby to lyse the yeast cell walls, which improvement comprises effecting said treatment under the influence of a water-soluble sulfite whereby said lysis is accelerated by the water-soluble sulfite. In accordance with this aspect, the yeast is treated with the enzyme in the presence of a water-soluble sulfite, or the yeast is pretreated, before the lysis, with a water-soluble sulfite. The water-soluble sulfite used in the pretreatment can contain cupric ions.

Only thio-compounds, e.g., mercaptoethanol and dithiothreitol, have been well known as agents promoting the lysis of yeast cell walls by yeast cell wall lytic enzymes but the mode of the promotion by these thio-compounds has nowadays been obscure although thiol groups may be considered to affect on chemical composition of yeast cell walls. So, the following findings are surprising: sulfites having no thiol group have an ability of promoting the lysis of yeast cell walls by yeast cell wall lytic enzymes: inorganic salts other than sulfites accelerate such promoting ability of sulfites: and the pretreatment of the yeast cells with sulfites and cupric ions makes yeast cells very susceptible to the yeast cell wall lytic enzymes.

DETAILED DESCRIPTION OF THE INVENTION

1. Yeast strain

Yeast strains shown as follows are available in this invention: Saccharomyces, Endomycopsis, Saccharomycodes, Nematospora, Candida, Torulopsis, Brettanomyces, Schizosaccharomyces and Kloeckera.

2. Yeast cell wall lytic enzyme

It is well known that yeast cell walls are lysed by treatment with yeast cell wall lytic enzymes. In this invention any kind of the yeast cell wall lytic enzymes can be employed. These enzymes have been reported by many persons and will be found in future. A typical enzyme among them is that produced by Arthrobacter luteus.

3. Sulfite

As the lysis of yeast cell walls and pretreatment of yeast cells are usually performed in aqueous solution, sulfites used in this invention are required to be soluble in water to a certain extent. Sulfites available in this invention are as follows: alkali metal salts, e.g., sodium and potassium salts, alkaline earth metal salts, e.g., magnesium and calcium, and ammonium salts.

4. Inorganic salt

Inorganic salt added to the reaction mixture with the yeast cell wall lytic enzymes and yeast cells are as follows: alkali metal, alkaline earth metal and ammonium salts of inorganic acid, e.g., sulfuric acid, nitric acid, carbonic acid, bicarbonic acid and phosphoric acid. For example, following salts are available: potassium chloride, sodium chloride, potassium sulfate, sodium nitrate, sodium carbonate, sodium bicarbonate, ammonium sulfate, ammonium chloride, calcium chloride, magnesium sulfate, sodium phosphate etc..

Inorganic salts shown above can be also used as a form of mixture with the yeast cell wall lytic enzymes prepared before the yeast cell wall lytic reaction.

5. Cupric ion

Cupric ions supplemented in the pretreatment of yeast cells with sulfites are mixed into the pretreatment solution as a form of salt, e.g., cupric sulfate, cupric nitrate and cupric ammonium hydroxide. Among them, cupric ammonium hydroxide is the most desirable. Cupric ammonium hydroxide is easily prepared by addition of ammonia to a solution of a cupric salt of a mineral acid.

6. Amount of agents used

Amounts of sulfites, inorganic salts and cupric ions is at will so far as the effect of this invention is observed. Generally, the following amounts indicated as mol concentration in a solution, in which yeast cells are suspended, is used.

Sulfites = 0.01–1.0 M, preferably 0.01–0.5 M.
Inorganic salts = 0–3.0 M, preferably 0.4–2.0 M.
Cupric ions = 0.1–20 mM, preferably 1–10 mM.

7. Lysis of yeast cell walls

In order to lyse yeast cell walls by means of this invention, various methods can be used. For example, sodium sulfite and potassium chloride are added to 0.1–20 percent, preferably 0.1–8 percent, of aqueous or buffered suspension of yeast cells at 0.01–1.0 M, preferably 0.01–0.5 M, and at 0–2 M, preferably 0.4–2 M, respectively, and a yeast cell wall lytic enzyme, for example, the enzyme produced by Arthrobacter luteus, ATCC No. 21,606, U.S. Pat. No. 3,716,452, is mixed with the suspension. The mixture is incubated at 15°–40°C for sufficient time to lyse the yeast cell walls, for example, for 0.5–5 hours with stirring, whereupon even a yeast cell wall, which is hardly lysed by the enzyme alone, is lysed very readily.

In case of pretreatment of yeast cells by sulfite, for example, sodium sulfite is added to 0.1–20 percent, preferably 0.5–8 percent, of aqueous suspension of yeast cells at 0.01–1 M, preferably 0.01–0.5 M, and the suspension is stirred or shaken at 5°–40°C for 0.2–2.0 hours. After the treatment the yeast cells are washed with water to remove sodium sulfite. Then, potassium chloride is added to 0.1–20 percent, preferably 0.1–8 percent of aqueous or buffered suspension of the pretreated yeast cells at 0–2 M, preferably 0.4–2 M, and the enzyme is mixed with the suspension. The mixture is incubated at 15°–40°C for sufficient time to lyse the yeast cell walls, for example, for 0.5–5 hours with stirring, whereupon even a yeast cell wall, which is hardly lysed by the enzyme alone, is lysed very readily.

In case of pretreatment by sulfites and cupric ions, for example, sodium sulfite and cupric ammonium hydroxide are added to aqueous suspension of yeast cells at 0.01–1.0 M, preferably 0.01–0.5 M, and at 0.1–20 mM, preferably 1.0–10 mM, respectively. The suspension is stirred or shaken at 5°–40°C for 0.1–2 hours. After the treatment, the yeast cells are washed with water to remove sodium sulfite and cupric ammonium hydroxide. Then the enzyme is added to 0.1–20 percent, preferably 0.1–8 percent, of aqueous or buffered suspension of the pretreated yeast cells and the mixture is incubated at 15°–40°C for sufficient time to lyse the yeast cell walls, for example, for 0.5–5 hours with stirring, whereupon even yeast cell walls, which is hardly lysed by the enzyme alone, is lysed very readily.

The degree of yeast cell wall lysis is estimated as described below. One ml of yeast aqueous suspension (20 mg dry matter/ml), 5 ml of buffer (when inorganic salt is added to the reaction mixture, buffer containing inorganic salt at 1.6 M is used), 1 ml of sodium sulfite solution (when sodium sulfite is ommited from the reaction mixture, water is used instead of sodium sulfite solution), 1 ml of enzyme solution and 2 ml of water are mixed together, and incubated at 25°C for 2 hours with stirring. The reaction mixture is diluted tenfold with water and optical density (O.D.) at 800 nm of the dilute suspension is determined. In a reference mixture the enzyme solution in the above reaction system is replaced by 1 ml of water. Percent of O.D. reduction caused by lysis of yeast cell walls is calculated according to the following equation.

% of O.D. reduction = (O.D. of the reference − O.D. of the reaction mixture)/(O.D. of the reference) × 100

After the cell walls are completely digested, only about 70 percent of O.D. reduction is generally observed because of the presence of the cell debris.

EXAMPLE 1

Commercial baker's yeast cells were lysed by the yeast cell wall lytic enzyme from Arthrobacter luteus under the reaction system with sodium sulfite (final concentration at 0.1 M). The enzyme solution used was 20.8 units per ml. Under the reaction system with sodium sulfite, the degree of yeast cell wall lysis was 42.6%, while that was 4.0% under the system without sodium sulfite. The degree of yeast cell wall lysis was rised ten times by addition of sodium sulfite to the reaction mixture.

EXAMPLE 2

Commercial baker's yeast cells were suspended at 1% in 0.1M sodium sulfite solution and stirred for 30 min. at room temperature. Then, the yeast cells were washed with water to remove sodium sulfite. The degree of yeast cell wall lysis of these yeast cells was estimated by the enzyme solution used in Example 1. The degree of yeast cell wall lysis of the treated yeast cells was 13.1%, while that of non-treated cells was 4.0%.

EXAMPLE 3

The degree of cell wall lysis of commercial baker's yeast cells was estimated by the yeast cell wall lytic enzyme from Arthrobacter luteus under the various conditions shown in Table 1. The enzyme solution used was 4.2 units per ml. The results are shown in Table 1. In Table 1, the symbols + and − in the column of "Reaction system" stand for the addition and no addition of the agent, respectively.

Table 1.

| Reaction system | | The degree of |
|---|---|---|
| Potassium sulfite (0.01M) | Potassium chloride (0.08M) | yeast cell wall lysis |
| − | − | 2.2% |
| + | − | 12.4% |
| − | + | 6.5% |
| + | + | 52.1% |

Under the reaction system with potassium sulfite and potassium chloride, the degree of yeast cell wall lysis was about 25-fold of that under the reaction system consisting of the enzyme alone.

EXAMPLE 4

The degree of yeast cell wall lysis of various strains shown in Table 2. was estimated by the enzyme solution used in Example 3. under the reaction system with sodium sulfite (final concentration at 0.1 M) and sodium chloride (final concentration at 0.8 M). Each yeast cells were harvested after the cultivation at 30°C for 4 days. Saccharomyces cerevisiae and Saccharomyces carlsbergensis were cultured in malt extract medium, Candida lipolytica in normal paraffin medium, and Kloeckera japonicum in methanol medium. The results are shown in Table 2.

Table 2.

| Yeast strain | The degree of yeast cell wall lysis | |
|---|---|---|
| | System with $Na_2SO_3$ and NaCl | System without $Na_2SO_3$ and NaCl |
| Saccharomyces cerevisiae | 85.8 % | 4.2 % |
| Saccharomyces carlsbergensis | 80.1 % | 10.4 % |
| Candida lipolytica | 81.5 % | 13.0 % |
| Kloeckera japonicum | 81.4 % | 6.6 % |

Under the reaction system with sodium sulfite and sodium chloride, the degree of yeast cell wall lysis of each yeast cells was extremely rised compared with that under the reaction system without them.

EXAMPLE 5

The degree of cell wall lysis of commercial baker's yeast cells was estimated by snail enzyme under the reaction system with sodium sulfite (final concentration at 0.1 M) and potassium chloride (final concentration at 0.8 M). The enzyme solution used was 2-fold diluted solution of snail gut juice. Under the system with sodium sulfite and potassium chloride, the degree of yeast cell wall lysis was 22.8%, while the yeast cells were not lysed under the system without them.

EXAMPLE 6

Commercial baker's yeast cells were suspended at 1% in 0.1 M sodium sulfite solution and stirred for 30 min at room temperature. Then the yeast cells were washed with water to remove sodium sulfite and lysed by the yeast cell wall lytic enzyme from Arthrobacter luteus under the reaction condition with or without sodium chloride (final concentration at 0.8 M). The enzyme solution used was 4.2 units per ml. The results are given in Table 3.

Table 3

| Yeast cells | System | The degree of cell wall lysis |
|---|---|---|
| Non-treated yeast | With NaCl | 6.5 % |
| | Without NaCl | 2.2 % |
| Treated yeast | With NaCl | 43.5 % |
| | Without NaCl | 7.2 % |

The degree of yeast cell wall lysis of commercial baker's yeast cells was rised by pretreatment of the yeast cells with sodium sulfite.

EXAMPLE 7

The degree of yeast cell wall lysis of commercial baker's yeast cells was estimated by the yeast cell wall lytic enzyme from Arthrobacter luteus under the reaction system with sodium sulfite (final concentration at 0.1 M) and each inorganic salt shown in Table 4 (final concentration at 0.8 M except potassium sulfite). Final concentration of potassium sulfate was 0.6 M. The enzyme solution used was 4.2 units per ml. The results are shown in Table 4.

Table 4

| Inorganic salt | The degree of yeast cell wall lysis |
|---|---|
| Potassium chloride | 52.2 % |
| Potassium sulfate | 36.2 % |
| Sodium chloride | 50.6 % |
| Ammonium chloride | 45.1 % |

Table 4-continued

| Inorganic salt | The degree of yeast cell wall lysis |
|---|---|
| Calcium chloride | 22.6 % |
| Ammonium sulfate | 46.8 % |
| Magnesium sulfate | 42.4 % |
| Sodium nitrate | 30.3 % |
| Sodium carbonate | 22.8 % |
| No addition | 12.2 % |

The degree of yeast cell wall lysis of commercial baker's yeast cells was extremely rised by addition of each inorganic salt.

EXAMPLE 8

One percent suspension of commercial baker's yeast cells in 0.1 M sodium sulfite solution containing cupric sulfate at 2.5 mM was stirred for 30 min at room temperature. Then the yeast cells were washed with water to remove sodium sulfite and cupric sulfate and lysed by the yeast cell wall lytic enzyme from Arthrobacter luteus. The enzyme solution used was 4.2 units per ml. The degree of yeast cell wall lysis of the treated cells was 26.3%, while that of non-treated yeast cells was 2.2%.

EXAMPLE 9

One percent suspension of commercial baker's yeast cells in 0.1 M sodium sulfite solution containing cupric ammonium hydroxide at each concentration shown in Table 5, was stirred for 30 min at room temperature. Then the yeast cells were washed with water to remove sodium sulfite and cupric ammonium hydroxide and lysed by the same enzyme solution as in Example 8. The results are given in Table 5.

Table 5.

| Concentration of cupric ammonium hydroxide | The degree of yeast cell wall lysis |
|---|---|
| 0 mM | 7.2 % |
| 0.5 mM | 19.0 % |
| 1.0 mM | 54.4 % |
| 2.5 mM | 79.5 % |
| 5.0 mM | 67.0 % |

The treated yeast cells with sodium sulfite and cupric ammonium hydroxide became to be extremely lysed by the enzyme.

EXAMPLE 10

Each yeast cells of various strains obtained in Example 3 were suspended at 1% in 0.1 M potassium sulfite solution containing cupric ammonium hydroxide at 5 mM and stirred for 30 min at room temperature. Then the yeast cells were washed with water to remove potassium sulfite and cupric ammonium hydroxide and lysed by the same enzyme solution as in Example 8. The results are shown in Table 6.

Table 6.

| Yeast strain | The degree of yeast cell wall lysis | |
|---|---|---|
| | Treated cells | Non-treated cells |
| Saccharomyces cerevisiae | 87.5 % | 4.2 % |
| Saccharomyces carlsbergensis | 85.5 % | 10.4 % |
| Candida lipolytica | 86.3 % | 13.0 % |
| Klolchera japonicum | 85.3 % | 6.6 % |

The degree of yeast cell wall lysis of the treated cells of all yeast strains used rose extensively.

EXAMPLE 11

One percent suspension of commercial baker's yeast cells in 0.1 M sodium sulfite solution containing cupric ammonium hydroxide at 3 mM was stirred for one hour at room temperature. Then the yeast cells were washed with water to remove sodium sulfite and cupric ammonium hydroxide and lysed by snail enzyme. The enzyme solution used was 2-fold diluted solution of snail gut juice. The degree of yeast cell wall lysis of the treated yeast cells was 10.2%, while non-treated cells were not lysed by snail enzyme.

What is claimed is:

1. In a method for lysis of yeast cell walls wherein the yeast is subjected to treatment in an aqueous medium with an enzyme which is capable of lysing yeast cell walls and which is selected from the group consisting of snail enzyme and an enzyme produced by Arthrobacter luteus thereby to lyse the yeast cell walls, the improvement which comprises effecting the treatment on the yeast cell walls under the influence of a water-soluble sulfite whereby the lysis is accelerated by the water-soluble sulfite, the influence being exerted before or at the time of the treatment by contacting the yeast with an aqueous sulfite in a molar concentration of from 0.01 to 1.0 M.

2. A process for lysis of yeast cell walls as claimed in claim 1 in which said treatment is effected in the presence of said water-soluble sulfite in said molar concentration in said aqueous medium.

3. A process for lysis of yeast cell walls as claimed in claim 1 in which said treatment is effected after the yeast has been subjected to pretreatment in an aqueous medium with said water-soluble sulfite in said molar concentration in the aqueous medium.

4. A process for lysis of yeast cell walls as claimed in claim 3 in which said pretreatment comprises suspending said yeast for at least for 0.2 hour in an aqueous medium which contains said water-soluble sulfite.

5. A process for lysis of yeast cell walls as claimed in claim 1 in which said treatment is effected in the presnece of a water-soluble inorganic salt other than said water-soluble sulfite in a molar concentration in said aqueous medium of up to 3.0 M.

6. A process for lysis of yeast cell walls as claimed in claim 3 in which said pretreatment in an aqueous medium with said water-soluble sulfite is effected further in the presence of cupric ions in a quantity of millimolar concentration in said aqueous medium of from 0.1 to 20 mM.

7. A process for lysis of yeast cell walls as claimed in claims 1 in which said water-soluble sulfite is selected from the group consisting of alkali metal sulfites, alkaline earth metal sulfites and ammonium sulfite.

8. A process for lysis of yeast cell walls as claimed in claim 5 in which said water-soluble inorganic salt other than said water-soluble sulfite is selected from the group consisting of alkali metal salts, alkaline earth metal salts and ammonium salts of hydrochloric acid, sulfuric acid, nitric acid, carbonic acid, bicarbonic acid and phosphoric acid.

9. A process for lysis of yeast cell walls as claimed in claim 6 in which said cupric ions are provided by cupric sulfate, cupric nitrate and cupric annonium hydroxide.

10. A process for lysis of yeast cell walls as claimed in claim 2 in which said treatment is effected in the presence of said water-soluble sulfite at a temperature from 15° to 40°C for at least 0.5 hour.

11. A process for lysis of yeast cell walls as claimed in claim 10 in which said yeast is dispersed in said aqueous medium in a concentration of from 0.1 to 20% by weight of dry basis.

12. A process for lysis of yeast cell walls as claimed in claim 3 in which said water-soluble sulfite is in a molar concentration of from 0.01 to 0.5M in said aqueous medium.

13. A process for lysis of yeast cell walls as claimed in claim 7 in which said water-soluble sulfite is sodium sulfite.

14. A process for lysis of yeast cell walls as claimed in claim 8 in which said water-soluble inorganic salt is selected from the group consisting of potassium chloride, sodium chloride, ammonium chloride, calcium chloride, sodium nitrate, sodium carbonate, potassium sulfate, ammonium sulfate, and magnesium sulfate.

15. A process for lysis of yeast cell walls as claimed in claim 14 in which said water-soluble inorganic salt is selected from the group consisting of potassium chloride and sodium chloride.

16. A process for lysis of yeast cell walls as claimed in claim 1 in which said yeast is selected from the group consisting of those belonging to Saccharomyces, Endomycopsis, Saccharomycodes, Nematospora, Candida, Torulopsis, Brittanumyces, Schizosaccharomyces and Kloekera.

17. A process for lysis of yeast cell walls as claimed in claim 16 in which said yeast is selected from the group consisting of those belonging to Saccharomyces, Candida and Kloeckera.

18. A process for lysis of yeast cell walls as claimed in claim 17 in which said yeast is selected from the group consisting of those belonging to Saccharomyces Cerevisiae, Saccharomyces Carlsbergensis, Candida Lipolytica and Kloeckera Japonicum.

* * * * *

UNITED STATES PATENT AND TRADEMARK OFFICE
CERTIFICATE OF CORRECTION

PATENT NO. : 3,917,510
DATED : November 4, 1975
INVENTOR(S) : Kumpei Kitamura et al It is certified that error appears in the above--identified patent and that said Letters Patent are hereby corrected as shown below:

On the cover sheet, in the Foreign Application Priority Data,

"April 11, 1973 Japan........... 48-87864" should read

-- August 4, 1973 Japan......... 48-87864--.

Signed and Sealed this sixth Day of April 1976

[SEAL]

Attest:

RUTH C. MASON
*Attesting Officer*

C. MARSHALL DANN
*Commissioner of Patents and Trademarks*